(12) United States Patent
Cawley et al.

(10) Patent No.: US 7,481,472 B2
(45) Date of Patent: Jan. 27, 2009

(54) LAYER PICKING END EFFECTOR SYSTEM, APPARATUS AND METHOD

(75) Inventors: Cliff Cawley, Nederland, TX (US); Don Cawley, Port Neches, TX (US); James Glenn, Lumberton, TX (US)

(73) Assignee: Sage Automation, Inc., Beaumont, TX (US)

( * ) Notice: Subject to any disclaimer, the term of this patent is extended or adjusted under 35 U.S.C. 154(b) by 396 days.

(21) Appl. No.: 11/358,672

(22) Filed: Feb. 21, 2006

(65) Prior Publication Data

US 2006/0242785 A1 Nov. 2, 2006

Related U.S. Application Data

(60) Provisional application No. 60/661,697, filed on Mar. 15, 2005.

(51) Int. Cl.
*B25J 15/06* (2006.01)

(52) U.S. Cl. .............................. 294/2; 294/65; 294/907; 901/40

(58) Field of Classification Search .................... 294/2, 294/64.1, 65, 907; 414/627, 737; 901/40, 901/46, 47

See application file for complete search history.

(56) References Cited

U.S. PATENT DOCUMENTS

| | | | |
|---|---|---|---|
| 3,387,718 A | | 6/1968 | Roth et al. |
| 3,404,787 A | | 10/1968 | Hayford |
| 3,523,707 A | * | 8/1970 | Roth .......................... 294/65 |
| 3,556,579 A | | 1/1971 | Seymour-Walker et al. |
| 4,639,030 A | * | 1/1987 | Bini .......................... 294/64.1 |
| 4,828,304 A | * | 5/1989 | No et al. ........................ 294/2 |
| 4,850,627 A | | 7/1989 | Franklin |
| 4,852,928 A | * | 8/1989 | Monforte ...................... 294/88 |
| 5,024,575 A | * | 6/1991 | Anderson ................... 414/627 |
| 5,088,878 A | | 2/1992 | Focke et al. |
| 5,207,467 A | * | 5/1993 | Smith ........................ 294/64.1 |
| 5,813,713 A | * | 9/1998 | Van Den Bergh ............. 294/65 |

* cited by examiner

*Primary Examiner*—Dean J Kramer
(74) *Attorney, Agent, or Firm*—Fulbright & Jaworski, L.L.P.

(57) ABSTRACT

A system, method and apparatus for handling and moving a layer of articles, such as cased products. The system and apparatus comprise a hood enclosure having four side panels, and four interconnected corner member. The side walls and corner members interoperate to form an adjustable enclosure to pick the layer of articles. A vacuum generate is utilized to evacuate air from the hood enclosure to assist in lifting the layer of articles. The hood enclosure may utilize an array of vacuum cups to assist in the lifting of articles into the hood enclosure. The method is directed towards utilizing the hood layer end effector to move and hand articles.

27 Claims, 7 Drawing Sheets

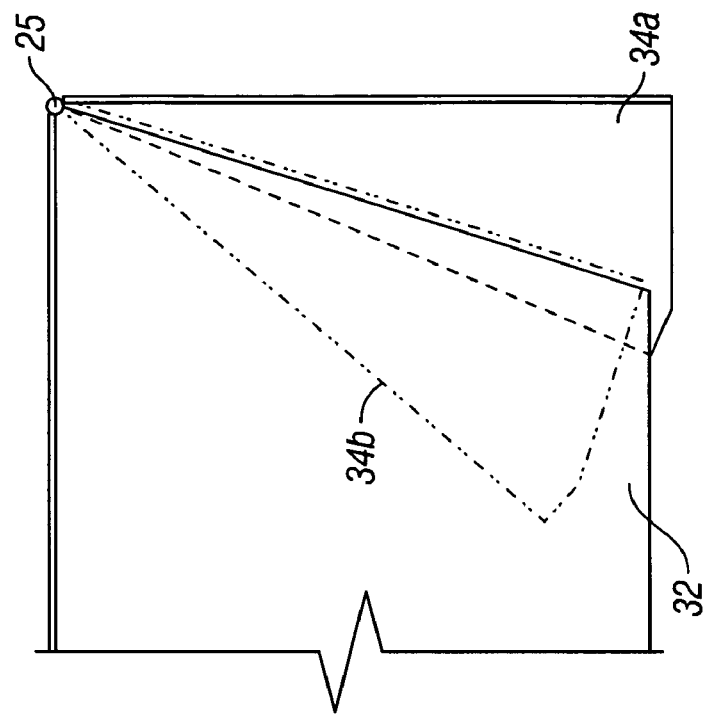
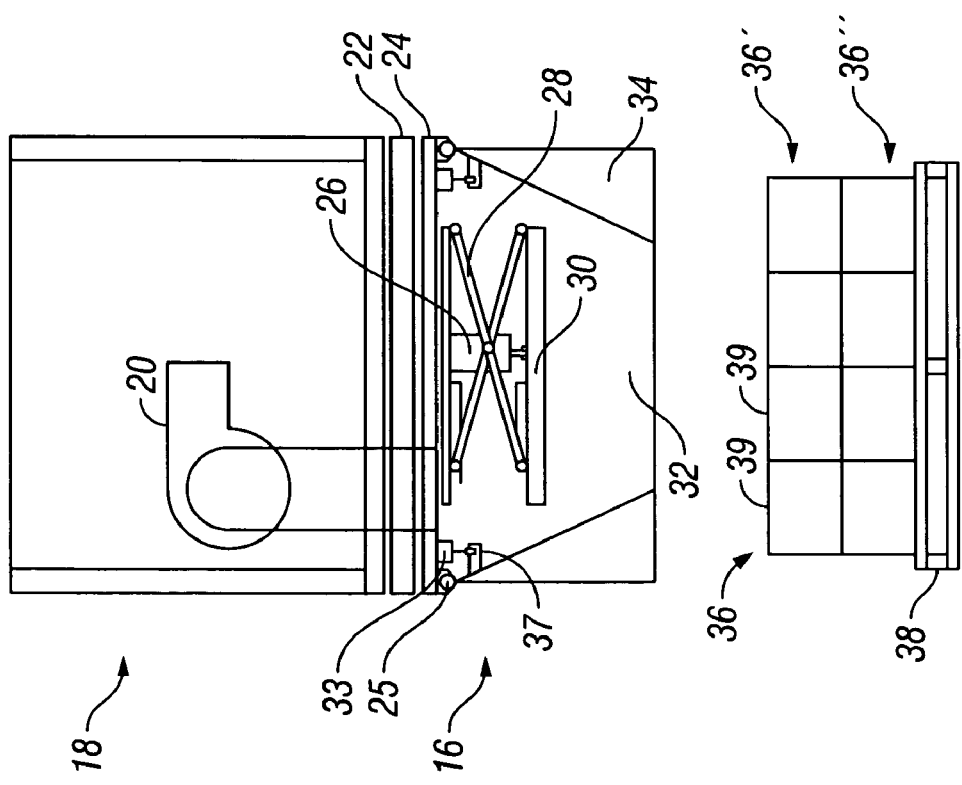
FIG. 2
FIG. 1

LAYER PICKING END EFFECTOR SYSTEM, APPARATUS AND METHOD

This application claims priority to U.S. Provisional Patent application Ser. No. 60/661,697, entitled "Layer Picking End Effector System, Apparatus, and Method," filed Mar. 15, 2005, which is incorporated herein by reference in its entirety.

TECHNICAL FIELD

The present invention is directed to a system, method, and apparatus for handling and moving a collection of articles, and more particularly is directed toward a system, method, and apparatus of a hood enclosure end effector for lifting and moving articles.

BACKGROUND OF THE INVENTION

An end effector is a tool on the action arm of a robot used to handle materials, perform procedures, or control activities. End effectors have sensors that give them information and communicate to the robot controller that items are in place, missing, or available; that procedures have been completed or a fault or collision occurred. In the following references, which are incorporated herein for all purposes, layer picking end effectors are described and have been in use for many years.

U.S. Pat. No. 3,387,718, titled "Pallet Loading and Unloading Apparatus," to Roth et al., relates to an apparatus for loading and unloading pallets that support multiple layers or tiers of articles, such as packages, boxes, cases for beverages, and other articles to be handled in rigid or semi-rigid containers of wood, paperboard or fiber materials. Conveyor means bring or take away articles from the apparatus. When the conveyor means brings articles to the apparatus, the articles are formed into layers having a desired pattern. After the layers are formed the layers are moved onto a belt. When the conveyor means takes articles away the entire layer is moved off the belt and dispersed by the conveyor means. As part of the apparatus, members seal off the periphery of the layer, and concurrently, push the articles into a compact arrangement to substantially reduce air flow past the article.

U.S. Pat. No. 3,404,787, titled "Suction Lift for Article Distribution and Storage System," to Hayford, et al. is directed to a suction lift for article distribution. The suction lift includes a hollow, moveable head; an open grate movable vertically with respect to the hollow, moveable head; and a flexible curtain depending from the rigid top of the hollow. The open grate is pervious to the movement of air so that suction is readily applied through the grate. The grate is moved vertically downward from the rigid top of the head when a single tier of units is to be lifted and is moved upward toward the rigid top of the head when more than one tier of units is to be lifted. Lifting of a plurality of tiers is improved if the depending curtain is held away from all but the lowermost of the tiers when suction is applied. The Hayford apparatus utilizes a vacuum to lift tiers of units.

U.S. Pat. No. 3,556,579, titled "Suction Pads," to Seymour-Walker et al., describes a suction pad having side portions depending downwardly from a top portion and adapted to be brought into a gripping relationship with the side faces of an article to be lifted by the pad. In one embodiment, the pad presents a lifting surface to the top surface of the article. The Seymour-Walker apparatus utilizes suction with a suction pad to lift an article.

U.S. Pat. No. 4,850,627, titled "Packaging Handling Method and Apparatus," to Franklin, addresses the transfer of a collation of flexible packages from a first location to a second location by employing a loading head. The loading head includes an enclosure having an opening and a permeable barrier extending across the opening. The opening and the collation of flexible packages are brought together at the first location. Suction is applied to the enclosure drawing air into the enclosure through the permeable barrier. Packages are drawn against the barrier by the air drawn through the permeable barrier and thus upper regions of the packages are expanded towards one another by sub-atmospheric air pressure created by the suction. The packages tend to seal against one another and to prevent flow of air through the collation, so that the collation is held by suction against the barrier. The enclosure is transferred to the second location and the suction is removed to release the collation from the enclosure. Apparatus for carrying out this process incorporates a motor-driven radial flow fan without an external shroud mounted on the enclosure to generate the suction. The Franklin apparatus utilizes a vacuum to lift a tray.

U.S. Pat. No. 5,088,878, titled "Apparatus for the Lifting of Tray Packs," to Focke et al., discusses that the lifting and transportation of sensitive articles incapable of bearing a mechanical load, without manual involvement, presents special difficulties in packaging technology. This applies, above all, to tray packs in which articles are arranged standing on a bottom part of small height, without any additional anchoring. For grasping and lifting articles of this type, the Focke reference describes a raisable and lowerable suction box which, with suitable dimensions, is placed over the article in a manner of a bell. By the generation of a vacuum within the suction box, the article (for example, tray pack) is held carefully and can be lifted by means of the suction box. Side walls of the suction box are arranged pivotably, to make it easier to place the suction box onto the article.

Although the above-mentioned devices are useful in their own right, an improved handling of articles is attainable with the present invention. The inventors have invented a hood style end effector which has four sides that are made of a material with limited flexibility, e.g., sheet metal, and can close around the bottom of a layer of cases, conform to whatever rectangular size the specific layer is, and have special corner members that provide air leakage control. Additionally, the present invention can detect the occurrence of slip sheets, and the dropping of lifted product.

BRIEF SUMMARY OF THE INVENTION

The present invention includes a system, apparatus, and method of a hood enclosure end effector for lifting and moving articles.

In one aspect of the invention, there is an apparatus with a suction generator coupled in fluid communication with a hood enclosure. Preferably, the suction generator is a high volume, low pressure air pump configured to provide evacuation of air from the hood enclosure. The hood enclosure may include one or more mounted pressure transducers to monitor suction level in the hood enclosure so that a predetermined suction level is maintained.

The hood enclosure has a top member that has a top side and a bottom side. Four side walls having a top end and bottom end are pivotally connected to the top member. The side walls have an exterior side and an interior side. An arm is connected to the interior side of the side wall, and the top member has an actuating device operably coupled with the arm for moving the side panel. This allows the side walls of the hood enclosure to expand and contract for articles of varying size.

The four corner members are slideably connected between an adjacent side panel. The corner member has a first and second panel. The first and second panels slide in concert with different side walls. In one embodiment, the first and second side panels are hinged together.

A first ceiling member is moveably connected to the bottom side of the top member. The first ceiling member is configured to be positioned on the top of articles to be lifted and has an array of cups. In one embodiment, the first ceiling member is connected to the top member via a moveable scissors frame. The first ceiling member has four separate cups that are used to detect slipsheets.

In another embodiment, a second ceiling member is moveably connected to the top member. The second ceiling member is movable separate from the first ceiling member. An array of suction cups is attached to a bottom side of the second ceiling member. In one configuration, the second ceiling member surrounds or partially surrounds the perimeter of the first ceiling member. Additionally, the second ceiling member can be used in conjunction with the first ceiling member (where the first ceiling member has suction cups) to assist in lifting articles.

In another embodiment, a set of dropped product detectors are mounted on the bottom end of at least one of the side walls. The dropped product detectors include light emitting devices on the bottom end of at least one of the side walls, and light beam detectors on the bottom end of at least one of the side walls, such that the light beam detectors detect the transmittance of light beams from the light emitting devices. If while lifting an array of articles, an article is dropped while lifting, the article will break a light beam, thus causing a signal or error situation to warn that an article has not been lifted, or has been dropped.

In another embodiment, the hood enclosure is connected to a robotic arm, or an overhead frame, for moving the hood enclosure in any of an x, y, or z axis. In certain aspects the robotic arm will allow rotation about a rotational axis ("u axis"). A robot may also include, but is not limited to a 6-axis articulated arm device.

In another aspect of the invention, there is a method for lifting and moving articles. The method includes providing a hood enclosure as discussed herein. The hood enclosure is positioned around a group of articles to be lifted. The side walls are clamped about the perimeter of the group of articles. Air is evacuated from the interior of the hood enclosure. The articles are lifted and/or moved from a first location to a second location.

In a further embodiment, the vacuum cups are used to lift an article independently of the hood enclosure. If the particular embodiment uses vacuum cups, then a vacuum source is supplied to the vacuum cups, and the vacuum cups are utilized to lift the articles.

In still further embodiments, the hood enclosure may be used in conjunction with the vacuum cups. If the particular embodiment uses vacuum cups, then a vacuum source is supplied to the vacuum cups, and the vacuum cups are utilized to assist in lifting the articles.

While the articles are being lifted or moved, dropped or non-lifted articles are detected and a signal can be provided to the system or operator of such an occurrence.

Additionally, the method may include detecting slip sheets, and moving slip sheets to a third location separate from the first and second location.

Cased product, including, but not limited to packages of canned units, and boxes containing products lend themselves to being picked with the present invention, with or without a vacuum cup assist. Such products may be lifted by using the hood only, the vacuum cups only, or a combination of both hood and vacuum cups.

In various embodiments, the present invention may pick a partial layer—anything from a single case to a complete layer missing one case—and the partial layer can have cases anywhere on the layer footprint. In a preferred embodiment, one or more vacuum cups are used to lift a partial layer.

Another aspect of the present invention is that it is able to pick and remove slip sheets from the top of a layer.

BRIEF DESCRIPTION OF THE DRAWINGS

For a more complete understanding of the present invention, reference is made to the following description in conjunction with the accompanying drawing, in which:

FIG. 1 illustrates an embodiment of the present invention;

FIG. 2 illustrates the opening and closing of the corner seal;

DETAILED DESCRIPTION OF THE INVENTION

Figure 3:
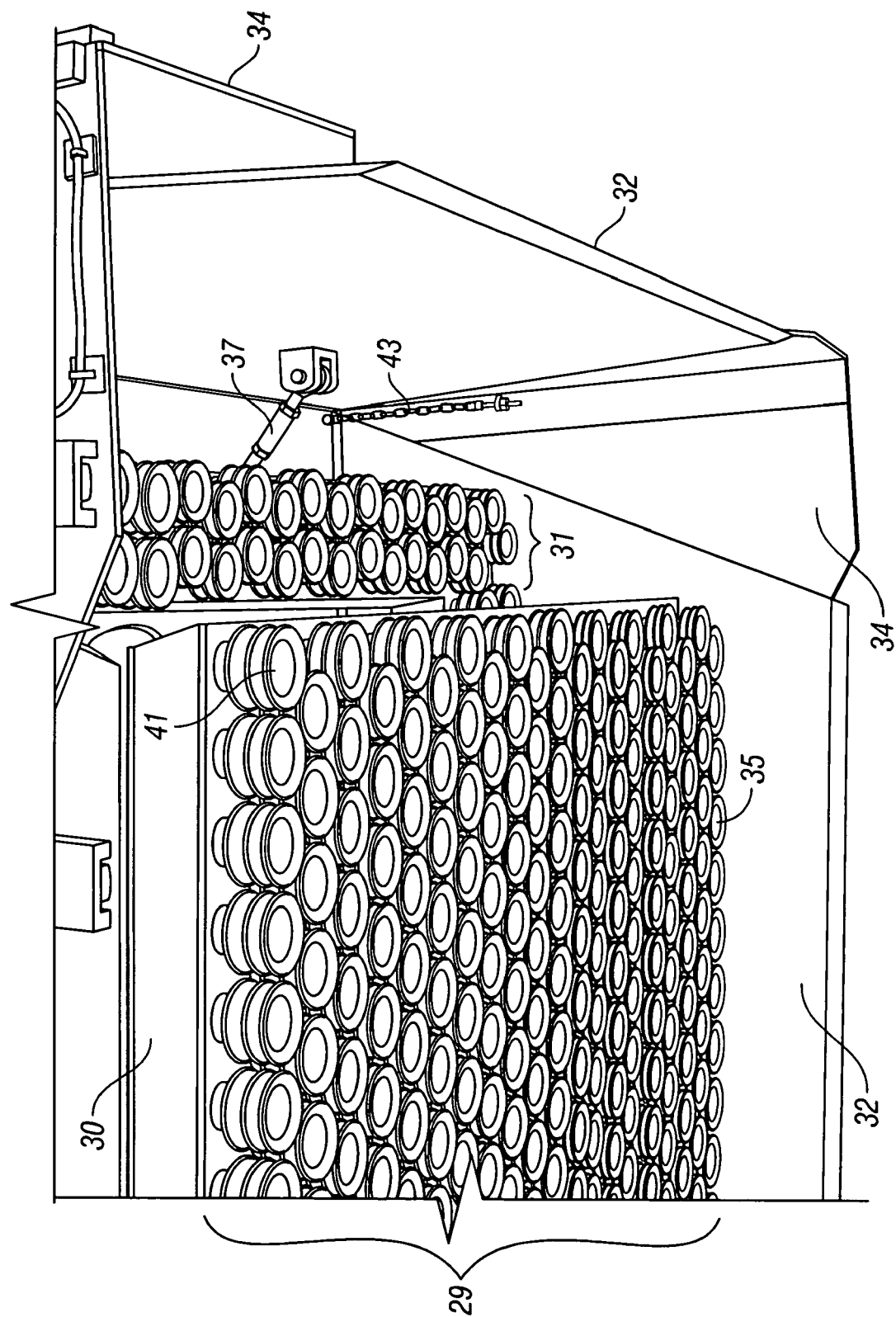
FIG. 3 illustrates a bottom-view of an embodiment of the present invention.

Referring now to FIGS. 1-6, an embodiment of the hood layer picker end effector of the present invention is shown. As shown in FIG. 1, in this embodiment, the hood layer picker end effector comprises four side walls 32 and four corner members 34. In this view, the front side wall has been removed to show the internal structure of the end effector. In certain aspects of operation, the corner members 34 and the side walls 32 close about a product layer 36 to be handled. The side walls 32 and corner members 34 cooperate together to form an expandable and retractable hood enclosure 16. The four side walls 32 are connected to a top member referred to herein as the compliance float 24. The compliance float 24 is generally square or rectangular in shape. The shape of the hood enclosure 16 when the side walls 32 are perpendicular to the floor is generally square or rectangular in shape. The hood end effector has the capability of using a vacuum array or portions of a vacuum array to remove any partial tier from the top of a pallet of stacked articles. Also, the end effector is capable of reliably handling a great variety and high percentage of articles, particularly those articles requiring special handling.

Typically, the side walls 32 are attached via hinges 25, or by other appropriate attachment means, to the compliance float 24 or other platform such that the side walls 32 may pivot inward or outward to retract or expand the hood enclosure 16. To pivot the side walls 32, an actuating device including, but not limited to a pneumatic or hydraulic cylinder may be used. The actuating device 33 is connected to an arm 37 extending from the upper inner side of the side walls 32. The actuating device 33 extends and retracts arm 37, which in turn extends and retracts the side walls 32.

Each of the side walls 32 may be expanded or retracted individually so that the hood enclosure can accommodate a particular length and width of a layer of product to be handled. The side walls 32 can fold inward to have the lower bottom portion of the inner sides of the side walls 32 press against the perimeter of the layer 36 to be picked. In a preferred embodiment, there are four sides wall, two side walls (e.g., a first and third side wall) oppose each other, with another two side walls (e.g., a second and fourth side wall) opposing each other. The opposing walls of the hood enclosure 16 may be closed and opened with synchronized motion (e.g., if the left wall closes 5 degrees, the right (opposing) wall also closes 5 degrees). If the product layer 36 is not centered between the side walls 32, a compliance float 24 allows the hood to move as the side walls close 32, to center the hood enclosure 16 above the product layer 36.

Referring to FIG. 2, the corner members 34 are interconnected with the side walls 32. In one embodiment, the corners members 34 have two panels that are hinged together. Each panel of the corner members are connected in a sliding fashion with an adjacent side wall 32. The two panels forming the corner members are hinged together. Typically, the corner member is held up by the chain 43 (see FIG. 3) attached to the inner side of the hood enclosure, and guided plates 44 (see FIG. 4) on the sides forming slots for the corner member. As shown in FIG. 2, the corner member is operable between a range of positions from 34a to 34b.

Referring back to FIG. 1, a suction generator 20 pumps air out of the hood enclosure 16. This overcomes a constant leakage and creates sufficient negative pressure to lift the product layer, within the time cycles of the application. The product layer 36 is held while lifting and carrying by suction generated by a suction generator 20, for example an air pump evacuating air from the hood. Preferably, a high volume suction generator capable of drawing 1, 2, 3 psi or more of vacuum inside the hood enclosure while evacuating air leaking through and around the layer of cases with leakage area in the range of 2, 4, 6, 8, or 10 inches square (in$^2$) is preferred. Typically, the hood end effector is capable of depalletizing thousands of cased products that may have leakage area up to 10 in$^2$ per layer. Air should be suctioned out continuously, providing a steady state negative pressure from inside the hood to underneath the cases sufficient to lift the layer weight—typically a net 1.0 psi.

The wrist break 22 is a collision sensor detecting when the hood enclosure 16 hits something while moving. Tripping this collision sensor creates a critical fault signal that automatically stops movement of the hood enclosure, and a warning is messaged visually, and/or electronically to an operator of the hood layer picker.

The compliance float 24 allows the hood enclosure to move in the horizontal plane, including rotation about a z-axis, to accommodate source pallets that have layers mis-aligned. Typically, the compliance float 24 is clamped when a robot arm brings the hood enclosure over the source pallet with product. Since the actual product can be located off center by rough handling from a supplier, or when the pallet containing the actual product is moved, the hood enclosure 16 is unclamped when it is lowered to the bottom of the layer, so when the sides come in to the layer sides, the hood may "float" to center itself over the actual center of the layer. After it is raised from the balance of the pallet load, it is re-clamped to bring the layer to perfect center and enable accurate placement.

Before the suction can be activated, the ceiling 30 is positioned on top of the layer of product 36. A ceiling platen is mounted so that it is free to be positioned up and down. As shown in FIG. 1, an exemplary scissors frame 28 is shown, but rod bearings, linear guide-ways, or other means can accomplish the motion. The selected structure should keep the ceiling 30 flat however. An air cylinder 26 moves the ceiling 30 up and down. Before the hood enclosure 16 is positioned, the cylinder 26 is extended lowering the ceiling 30 to near the bottom of the hood enclosure 16. A valve is then opened allowing the cylinder to be moved easily. The hood enclosure 16 is lowered and the ceiling 30 contacts the top of the top layer 36 of the product. When the hood enclosure 16 is lowered to its final position, the ceiling 30 rests on top of the layer. The valve is then closed, blocking the ports of the cylinder and locking the ceiling 30 in position.

Figure 4:
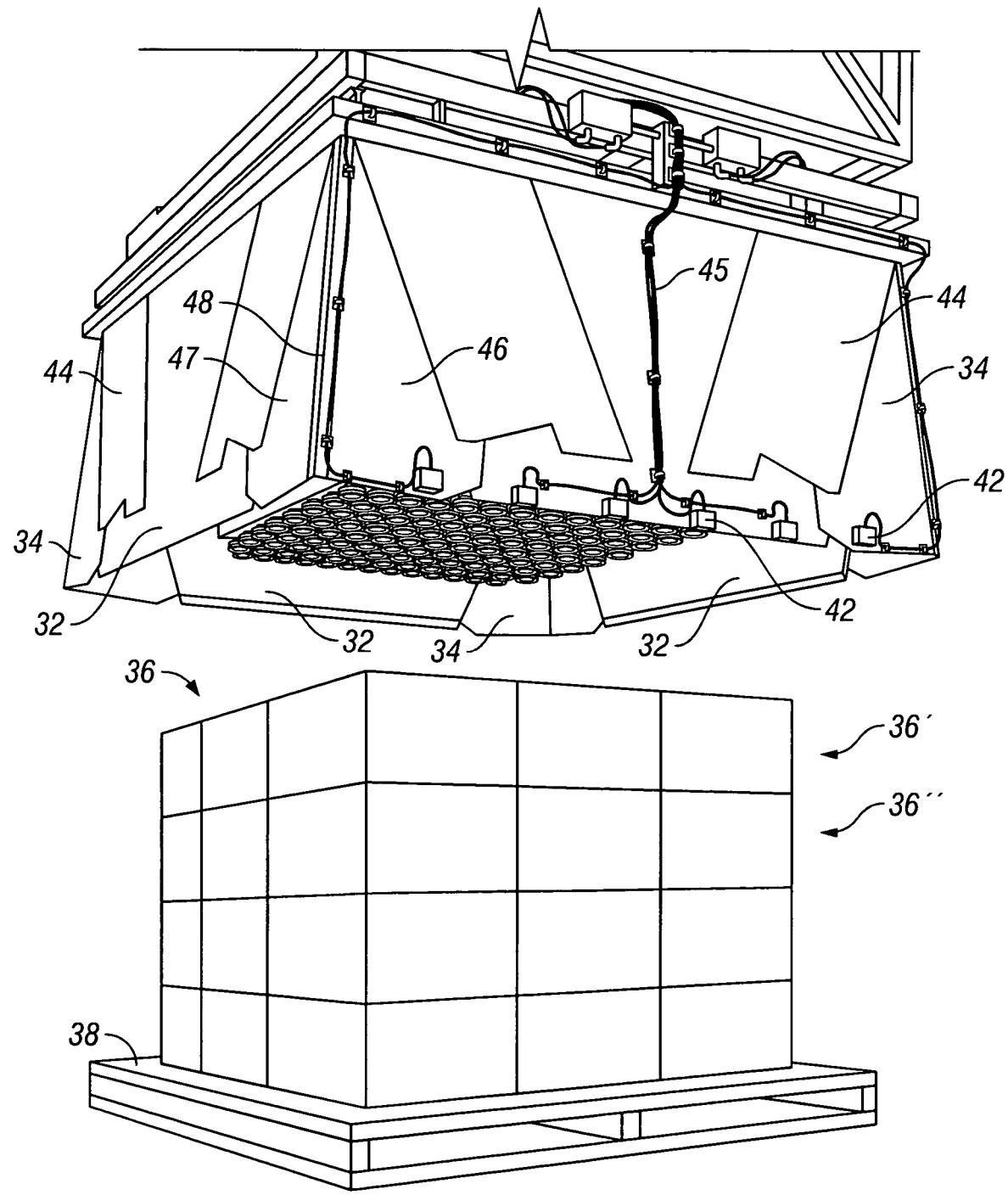
FIG. 4 illustrates an embodiment of the present invention with the hood fully open and initially positioned over cased product.

Referring to FIG. 4, the hood enclosure 16 itself is composed of four walls, four corner members and the aforementioned ceiling assembly. Each wall 32 is wider at the top than the widest/longest product layer plus a positioning tolerance. The bottom of the side wall is narrower than the smallest product minus the tolerance. The corner members 34, which are typically connected by a hinge 48, block substantially all air leakage, and while doing that, conform to all size and tolerance layers. The corner member attached to the inner side of the hood enclosure and articulate with guide plates 44 on the sides that form slots for the corner member 34. In a preferred embodiment, the walls 32 of the hood enclosure 16 are stiff or have limited flexibility. A stiff wall typically provides added friction to the interaction between the layer and the hood. In certain aspects, the walls provide additional clamping force due to the force of the vacuum over the area of the walls 32.

The above describes an embodiment of a basic hood layer picker. The invention provides a useful apparatus to de-palletize cases with poor integrity, leaky tops, loose bottoms and cases with high density.

Referring now to FIGS. 3, 4 and 7-9, the hood layer picker, is shown with a vacuum cup array 29. The moveable ceiling 30 in the hood enclosure 16 has mounted to it an array 29 of vacuum cups 35. The vacuum cups 35 are coupled to a vacuum generating source 40. The vacuum cups 35 can lift or aid in lifting a layer or partial layer of product. Preferably, the vacuum cups 35 are made of a flexible rubber, or plastic. Other materials can be used to form the vacuum cups 35. However, the vacuum cups 35 preferably are flexible so as not to damage product casing. The vacuum cup array 29 can serve as an internal ceiling for the hood enclosure to prevent light layers and sealed patterns from being sucked inside the hood if excessive suction is applied.

Additionally, the vacuum generating source 20, 40, or both 20 and 40 may be configured to provide evacuation of air from the hood enclosure 16, the vacuum array 29, or the hood enclosure 16 and the vacuum array 29. These various embodiment can create suction about the perimeter of the layer of product, the top surface of the layer of product, or both the perimeter and the top surface of a layer of product. This suction may be controlled by one or more valving arrangements coupled to one or more blowers.

An appropriate diameter of each circular cup in the array 29 that will provide adequate hold strength for a particular product case lifted is about ⅓ the width of the smallest case lifted. A staggered array is a preferable arrangement. The cups may be all of the same size, or an array of different sizes. The shape of the cup is preferably round, however, the cups may take other useful shapes such as square, oval, rectangular, triangular or other polygons.

In one exemplary embodiment, over a 45"×54" area, about 670 vacuum cups may be used. On average about half the cups will have a certain amount of leakage. This leakage, however, should be constantly removed by the suction generator 40. If sealed properly, a vacuum pressure in the cup will result in about 1, 2, 3 or more psi.

For example, a suction generator 40 motor is about 15 horsepower and is capable of providing appropriate negative pressure while pumping. In certain aspects, the suction generator provides about 1, 2, 3, 4, 5, or 6 psi or more of negative pressure. The suction generator will typically pump about 100 cubic feet per minute. In certain instances, all or some of the vacuum cups may leak, so all or some of the vacuum cups may have a throttle orifice (small openings in the suction inlet of the cups) to limit the leakage. Throttling reduces the pressure lifting the cases but may be a necessary trade off. One example is a cup with an orifice of about 0.07 inch.

Additionally, the area of coverage of the array 29 of vacuum cups 35 should be about as large as the top surface of the largest layer to be handled, plus the tolerance of its misposition. The array 29 of vacuum cups 35 serves as a ceiling to the product layer 36. In one embodiment, the vacuum cup array 29 is connected to the ceiling 30, such that the vacuum cup array 29 is moveable with the ceiling. The vacuum cup array 29 should be configured to come in to contact with the smallest product layer.

The hood end effector can be configured to detect slips sheets on top of layers of product so the slip sheets can be placed into a hopper, or some other location, and provide access to the next layer (see below). In one embodiment, dropped cases can be detected; that is, cases that drop product out of the bottom of the case while being lifted, or isolated cases not picked up when the layer of cases is lifted. As shown in FIGS. 3, 7, 8 and 9, the vacuum cup array 29 may have an second array 31 generally surrounding or outside of the vacuum cup array 29. For example, an inner core (i.e., vacuum cup array 29) sized to the smallest layer, with an outer section 31 sized to a maximum layer plus tolerance. This outer section 31 retracts to the upper height of the hood enclosure 16 which can contain it when the inner core vacuum cup array 29 is used to pick slip sheets or serve as a ceiling. The outer section 31 deploys downward with the inner core vacuum cup array 29 when picking a layer. In certain aspects, the outer section 31 may be operatively coupled to a second ceiling member. In a further aspect, a second ceiling member is moveably connected to the top member. The second ceiling member is movable separate from the first ceiling member. An array of suction cups is attached to a bottom side of the second ceiling member. In one configuration, the second ceiling member surrounds or partially surrounds the perimeter of the first ceiling member. Additionally, the second ceiling member can be used in conjunction with the first ceiling member (where the first ceiling member has suction cups) to assist in lifting articles.

In one embodiment, one or more pressure transducers are mounted on the hood enclosure to monitor suction in the hood enclosure to maintain a predetermined suction level. Each product layer may have leakage varying from the norm. To provide a constant lifting force under conditions of unpredictable leakage, a pressure transducer, which can be placed anywhere on the inside of the hood, measures the real-time negative pressure in the hood. With a constant pump volume, the negative pressure will be reduced if the leakage is above normal, and increased if the leakage is less than normal. The air pump motor should be oversized to accommodate evacuation of above normal leakage. A motor speed control on the air pump motor can adjust the air pump volume. The weight per square inch of all product layers is known and that data is used to set a target negative pressure standard for each product to be handled with the hood. For example, if the total product weight is 1000 lbs and the total top surface area is 1000 sq. inches, then the product weight divided by the product would equal 1 pound per square inch of vacuum necessary to lift the product. Actually, slightly more than 1 pound per square inch of vacuum would be required to safely lift and move the products.

If the steady state negative pressure is under target for a given layer, the air pump motor is set to a higher speed. If the hood negative pressure is much higher than target, the air pump motor speed is reduced. In one embodiment, one or more pressure transducers can be mounted on the hood enclosure to monitor suction in the enclosure for maintenance of a predetermined suction level.

Figure 5:
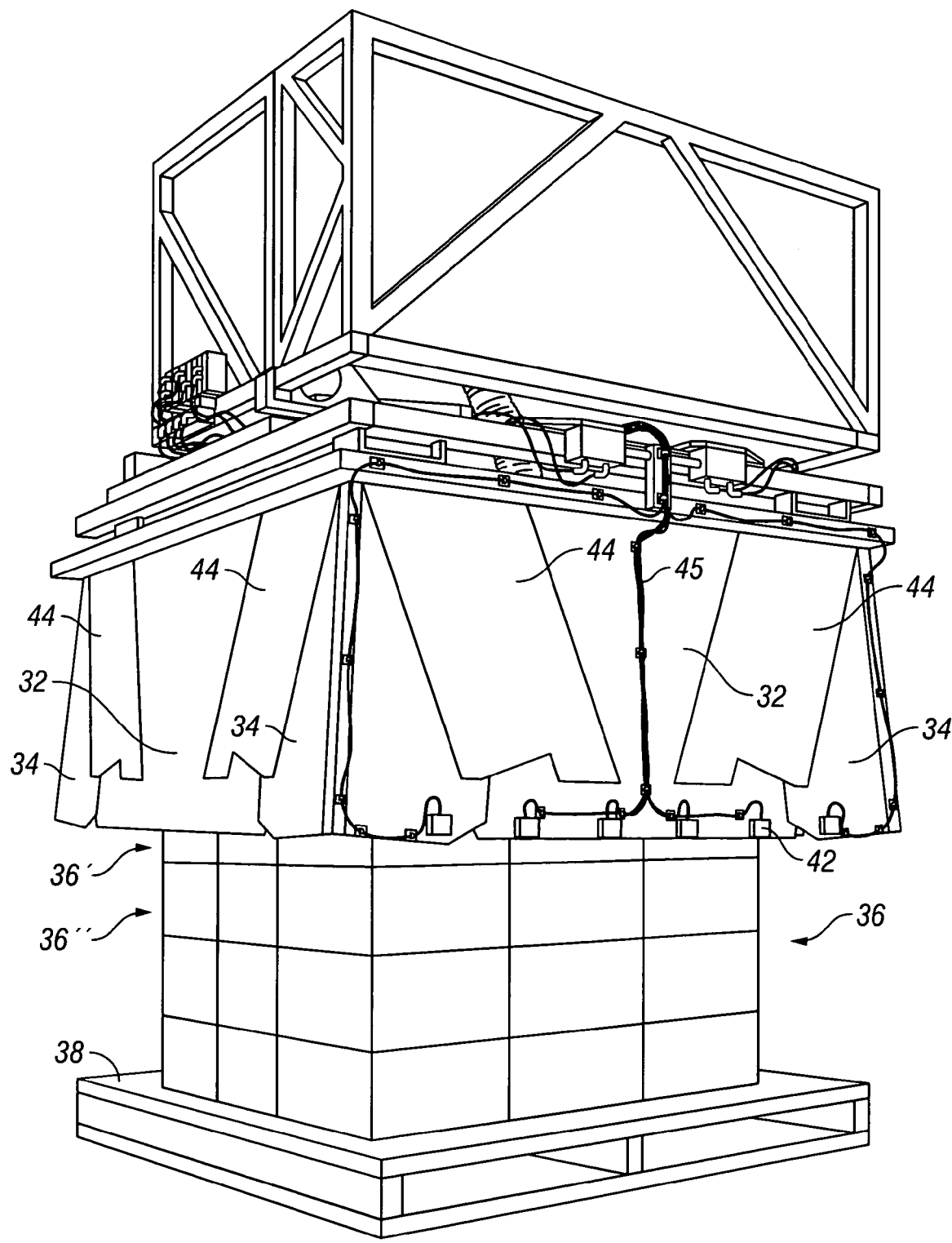
FIG. 5 illustrates an embodiment of the present invention with an open hood, down and over packages layers to be picked.
Figure 6:
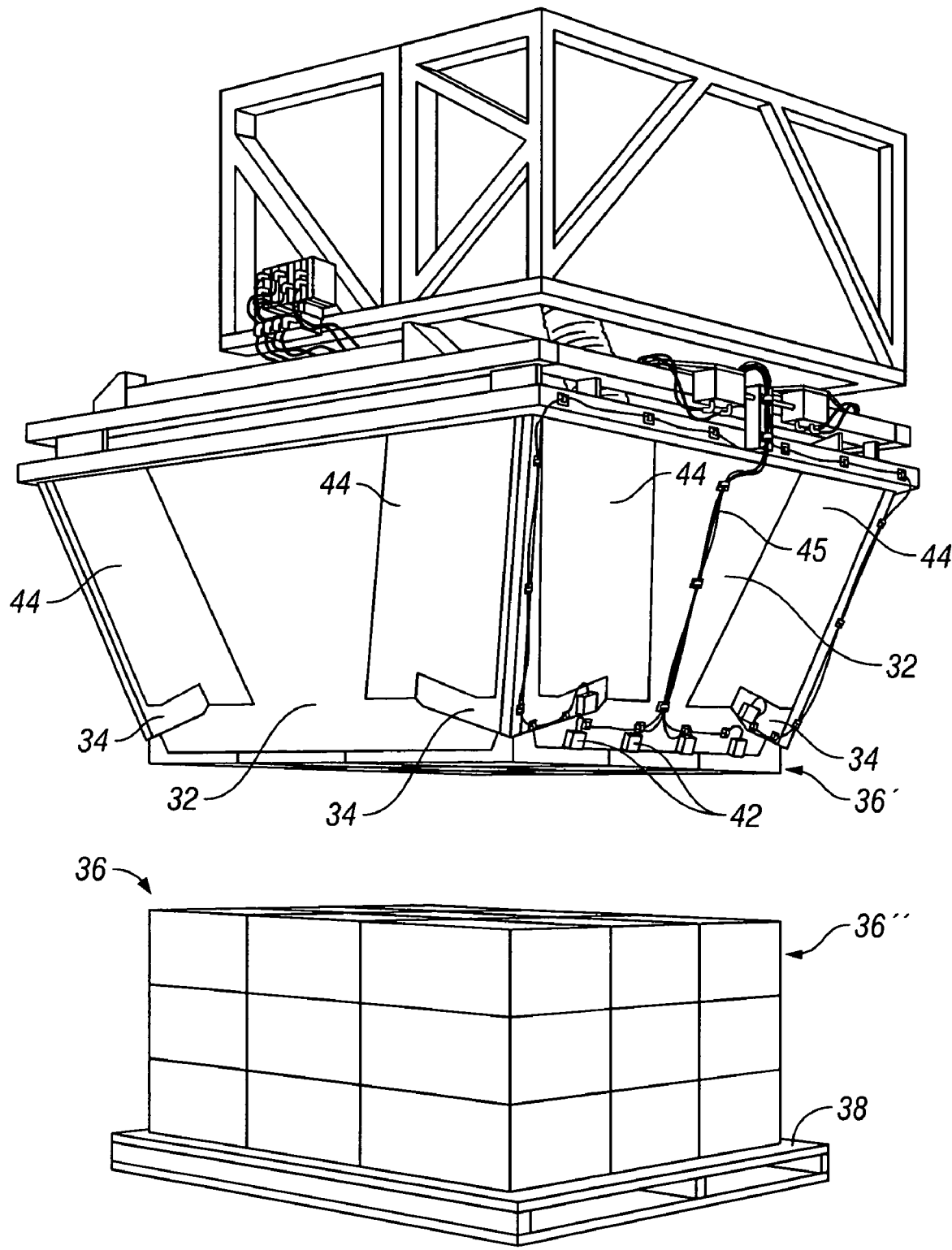
FIG. 6 illustrates an embodiment of the present invention with the closed hood holding layer of cases of product.
Figure 8:
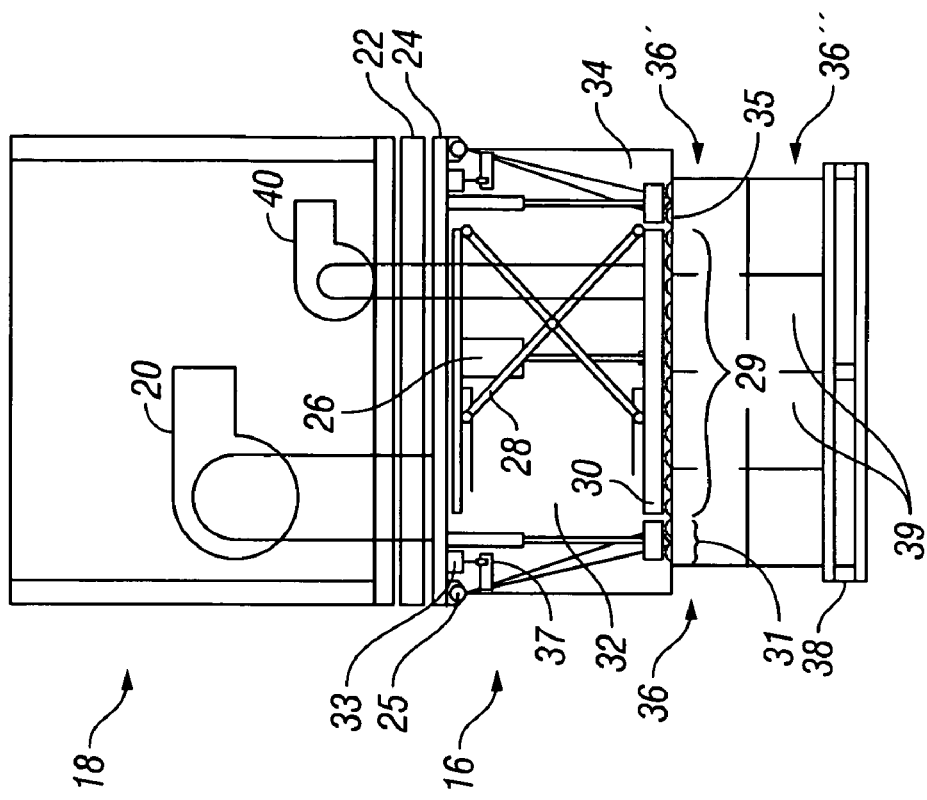
FIG. 8 illustrates an embodiment of the present invention with vacuum array engaging a product layer.
Figure 7:
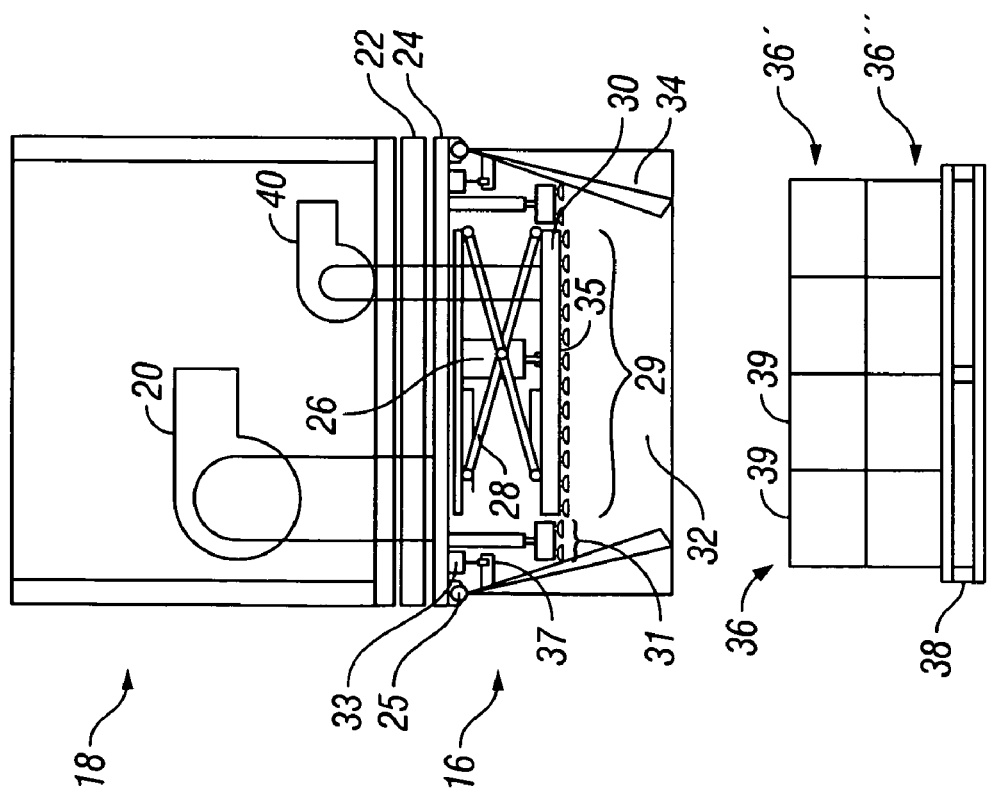
FIG. 7 illustrates an embodiment of the present invention with a vacuum array.
Figure 9:
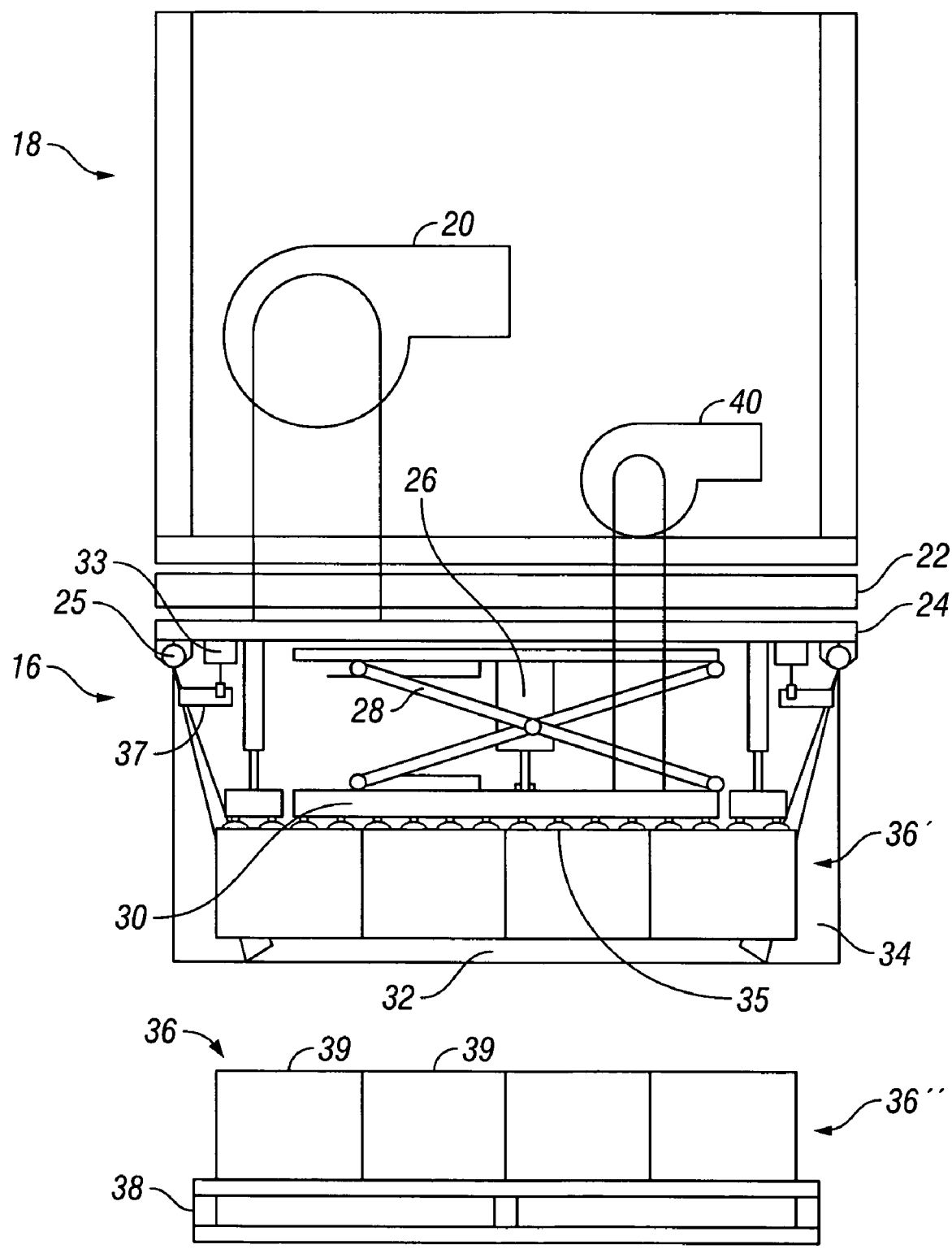
FIG. 9 illustrates an embodiment of the present invention lifting a package layer.

Referring now to FIGS. 4, 5, and 6, an example of the hood layer picker of the present invention is shown with a lost case detector. It is important to detect a case that either falls from the hood enclosure 16 or was never suctioned at all. The hood enclosure 16 has a set of light emitting devices 42 that generate light beams that cut the layer pick up plane at the bottom of the long sides of the hood enclosure 16. The light emitting devices 42 are typically in communication with the controls of the end effector via cabling 45. As shown in FIG. 9, the product layer 36" is exposed when layer 36' is lifted. In certain aspects, multiple layers may be lifted at a time depending on the size and weight of the layer.

When cases are picked by vacuum cups 35, the ceiling and cases in layer 36' are retracted up inside the hood enclosure 16. This allows the light beams to pass under the layer 36' of cases held. If after picking the layer of cases 36' and retracting them into the hood, the light beams are not all cleared, the apparatus can determine that at least one case has not been picked. If all the layer of cases 36' have been picked, but the beam is broken during movement, it will conclude that a case has fallen out, or that material/product has fallen out the bottom of a case. A light sensor on the opposite side of the light emitting device may be used to determine if the light beam is broken or not.

At various positions in vacuum cup array 29, preferably the corners or in proximity of the corners, there may be at least 1, 2, 3, 4 or more cups (slip sheet vacuum cups) 41, preferably at least four, that may be individually plumbed with very low pressure vacuum generators and sensors to detect this low vacuum. The level of vacuum is sufficient to lift a slip sheet but not a product case. Every time a layer is picked up, the ceiling with vacuum cups contacts the top surface of the layer, only the four special cups are turned on and the hood is raised only about an inch or two. If the cups maintain vacuum, a slip sheet is detected. If the cups have no negative pressure after the hood is raised, a slip sheet is not present.

The sequence of operation depends on which end effector type has been selected for the specific product, hood, vacuum array, or a combination of hood and vacuum array. The first steps are common for both. In a common sequence, the open hood enclosure 16 with core vacuum cup array 29 comes down over the product layer 36' until the cup array touches the top. The slip sheet vacuum cups 41 are activated and then the vacuum array 29 is raised an inch or two. If the cups have vacuum sensed, the slip sheet held and moved by the core vacuum array 29 and deposited into a slip sheet receptacle, such as a bin.

With a hood enclosure used without a vacuum cup array 29, the hood enclosure 16 then moves down over the product layer 36' with the core vacuum array 29 or a ceiling down but relaxed and capable of being pushed up easily. The hood enclosure 16 comes down until the bottom of the side walls are within about an inch above the bottom of the tier.

In certain aspects the compliant clamps are released, the side walls 32 are brought in against the layer, the hood floats to center above the product layer 36', the suction is turned on and when the target vacuum is achieved, the product layer 36' is lifted and the compliance clamps engaged.

With a hood enclosure having the vacuum cup array 29, hood enclosure 16 then descends over the tier 36' with both the vacuum array 29 section and core down and relaxed. On approach, the vacuum is turned on. When vacuum is sensed the hood enclosure 16 stops descending. The ceiling and the suctioned cases 36' are retracted into the hood enclosure 16, and the hood enclosure 16 is raised enough to have the light beams just above the remaining tiers of product 36". If all light beams are correct, all cases of the picked layer 36' are confirmed captured and they are then moved. Typically, the pressure transducers indicate that a layer has been engaged by the hood and light beams monitor the integrity of lifting using the vacuum array.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, compositions of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus for lifting articles, said apparatus comprising:
    a suction generator; and
    a hood enclosure comprising:
        a top member having a top side and a bottom side,
        a plurality of side walls having a top end and a bottom end, said top end pivotally connected to said top member, said side walls having an interior side and an exterior side,
        a plurality of corner members having a first panel and a second panel, said corner member slideably connected to side walls adjacent said corner member, and
        a first ceiling member moveably connected to the bottom side of said top member;
    wherein said first ceiling member is connected to said top member via a moveable scissors frame and
    wherein said suction generator is in fluid communication with said hood enclosure.

2. The apparatus of claim 1, wherein the suction generator is a high volume, low pressure air pump.

3. The apparatus of claim 1, wherein said suction generator is configured to provide evacuation of air from said hood enclosure.

4. The apparatus of claim 1, wherein the first ceiling member is configured to position on the top of articles to be lifted.

5. The apparatus of claim 1, wherein the corner member comprises two panels hinged together.

6. The apparatus of claim 1, wherein the first ceiling member is adjustable to varying article heights.

7. The apparatus of claim 1, further comprising a robotic arm connected to said hood enclosure for moving said hood enclosure in any of an x, y, or z axis.

8. The apparatus of claim 1, further comprising a second ceiling member moveably connected to said top member, said second ceiling member movable separate from said first ceiling member.

9. The apparatus of claim 8, further comprising an array of suction cups attached to a bottom side of said second ceiling member.

10. The apparatus of claim 9, wherein the first ceiling member, second ceiling member, or both the first and second ceiling member is also configured to lift slip sheets.

11. The apparatus of claim 1, further comprising a set of dropped product detectors on the bottom end of at least one of the side walls.

12. The apparatus of claim 11, wherein the dropped product detectors comprise light emitting devices on the bottom end of at least one of the side walls, and light beam detectors on the bottom end of at least one of the side walls, such that the light beam detectors detect the transmittance of light beams from the light emitting devices.

13. The apparatus of claim 1, further comprising one or more pressure transducers mounted on the hood enclosure to monitor suction level in the hood enclosure for maintenance of a predetermined suction level.

14. An apparatus for lifting articles, said apparatus comprising:
    a suction generator; and
    a hood enclosure comprising:
        a top member having a top side and a bottom side,
        a plurality of side walls having a top end and a bottom end, said top end pivotally connected to said top member, said side walls having an interior side and an exterior side,
        a plurality of corner members having a first panel and a second panel, said corner member slideably connected to side walls adjacent said corner member, and
        a first ceiling member moveably connected to the bottom side of said top member,
        a second ceiling member moveably connected to said top member, said second ceiling member movable separate from said first ceiling member,
        a first array of suction cups attached to said first ceiling member, and
        a second array of suction cups attached to said second ceiling member;
    wherein said suction generator is in fluid communication with said hood enclosure.

15. The apparatus of claim 14, wherein the suction generator is a high volume, low pressure air pump.

16. The apparatus of claim 14, wherein said suction generator is configured to provide evacuation of air from said hood enclosure.

17. The apparatus of claim 14, wherein the first ceiling member is configured to position on the top of articles to be lifted.

18. The apparatus of claim 14, wherein the first ceiling member is connected to said top member via a moveable scissors frame.

19. The apparatus of claim 14, wherein the corner member comprises two panels hinged together.

20. The apparatus of claim 14, wherein the first ceiling member is adjustable to varying article heights.

21. The apparatus of claim 14, further comprising a robotic arm connected to said hood enclosure for moving said hood enclosure in any of an x, y, or z axis.

22. The apparatus of claim 14, wherein the first ceiling member is also configured to lift slip sheets.

23. The apparatus of claim 14, further comprising a set of dropped product detectors on the bottom end of at least one of the side walls.

24. The apparatus of claim 23, wherein the dropped product detectors comprise light emitting devices on the bottom end of at least one of the side walls, and light beam detectors on the bottom end of at least one of the side walls, such that the light beam detectors detect the transmittance of light beams from the light emitting devices.

25. The apparatus of claim 14, further comprising one or more pressure transducers mounted on the hood enclosure to monitor a suction level in the hood enclosure for maintenance of a predetermined suction level.

26. A method for lifting articles, said method comprising:
   providing a hood enclosure comprising:
      a top member having a top side and a bottom side,
      a plurality of side walls having a top end and a bottom end, said top end pivotally connected to said top member, said side walls having an interior side and an exterior side,
      a plurality of corner members having a first panel and a second panel, said corner member slideably connected to side walls adjacent said corner member, and
      a first ceiling member moveably connected to the bottom side of said top member;
   positioning said hood enclosure around a group of articles to be lifted;
   clamping the side walls about a perimeter of the group of articles;
   evacuating air from an interior of the hood enclosure;
   lifting said articles from a first location to a second location;
   detecting slip sheets; and
   moving slip sheets to a third location separate from the first and second location.

27. The method of claim 26, further comprising:
   detecting whether an article has dropped while being lifted, and providing a signal to an operator of an occurrence of a dropped article.

\* \* \* \* \*